United States Patent Office 3,448,631
Patented June 10, 1969

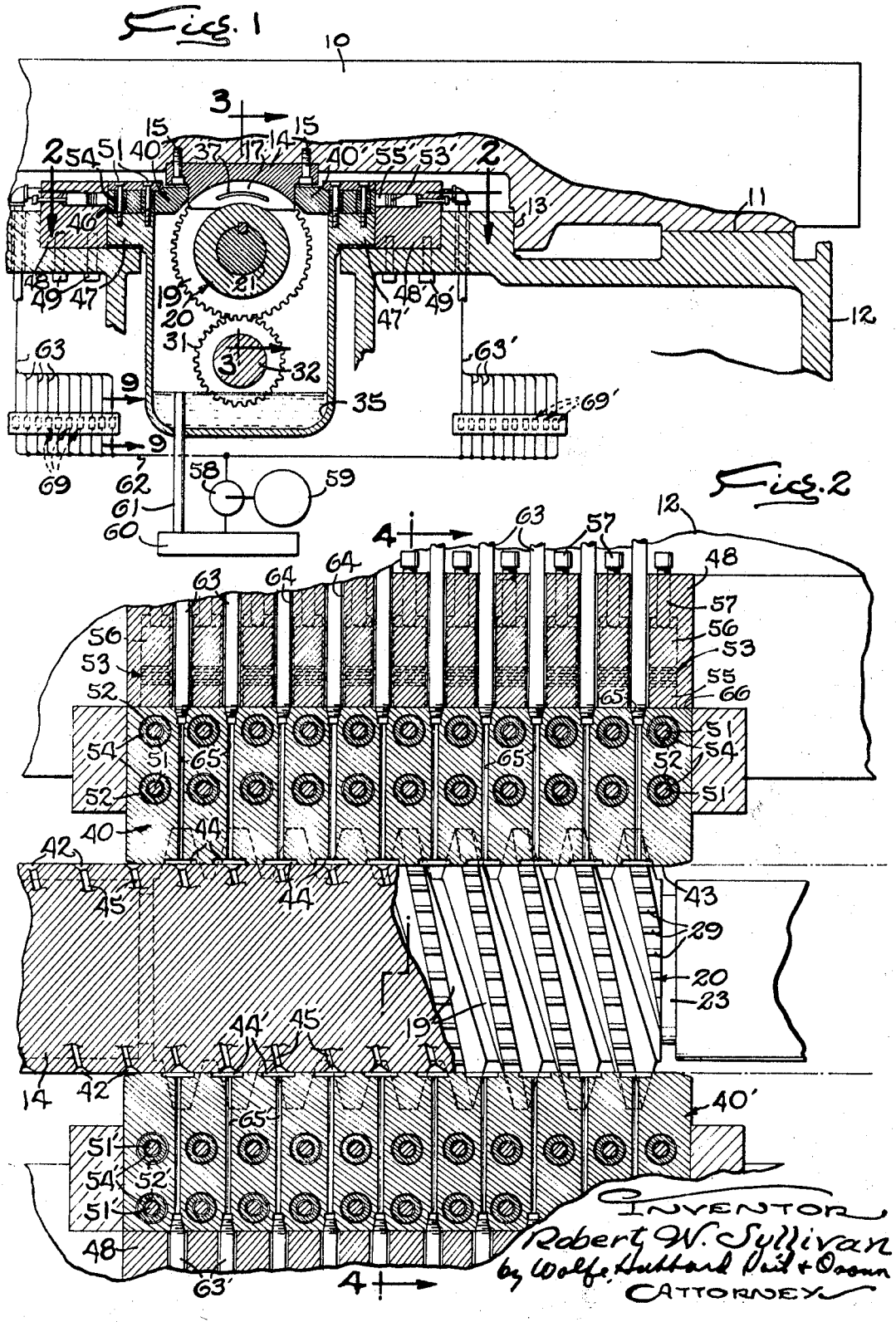

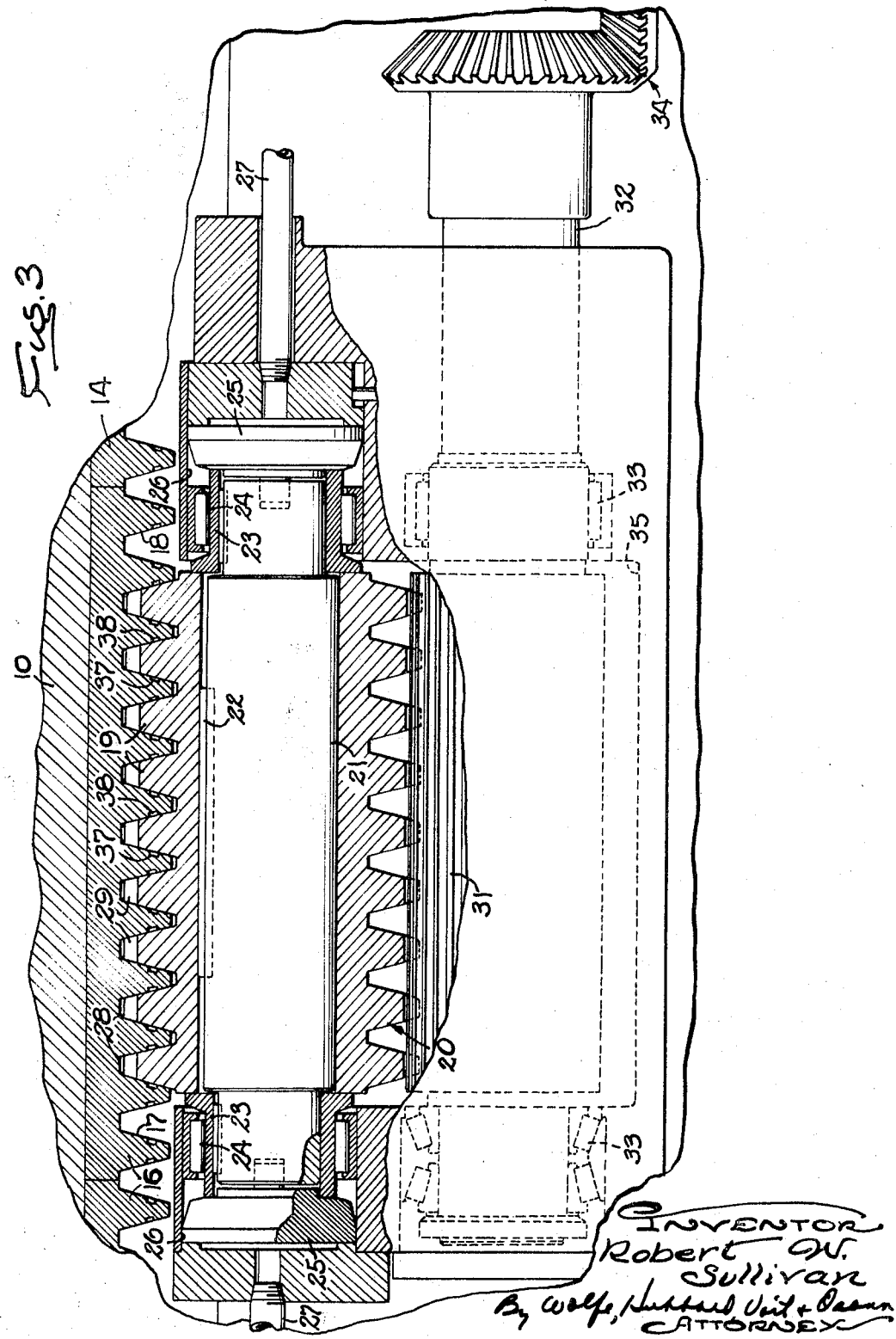

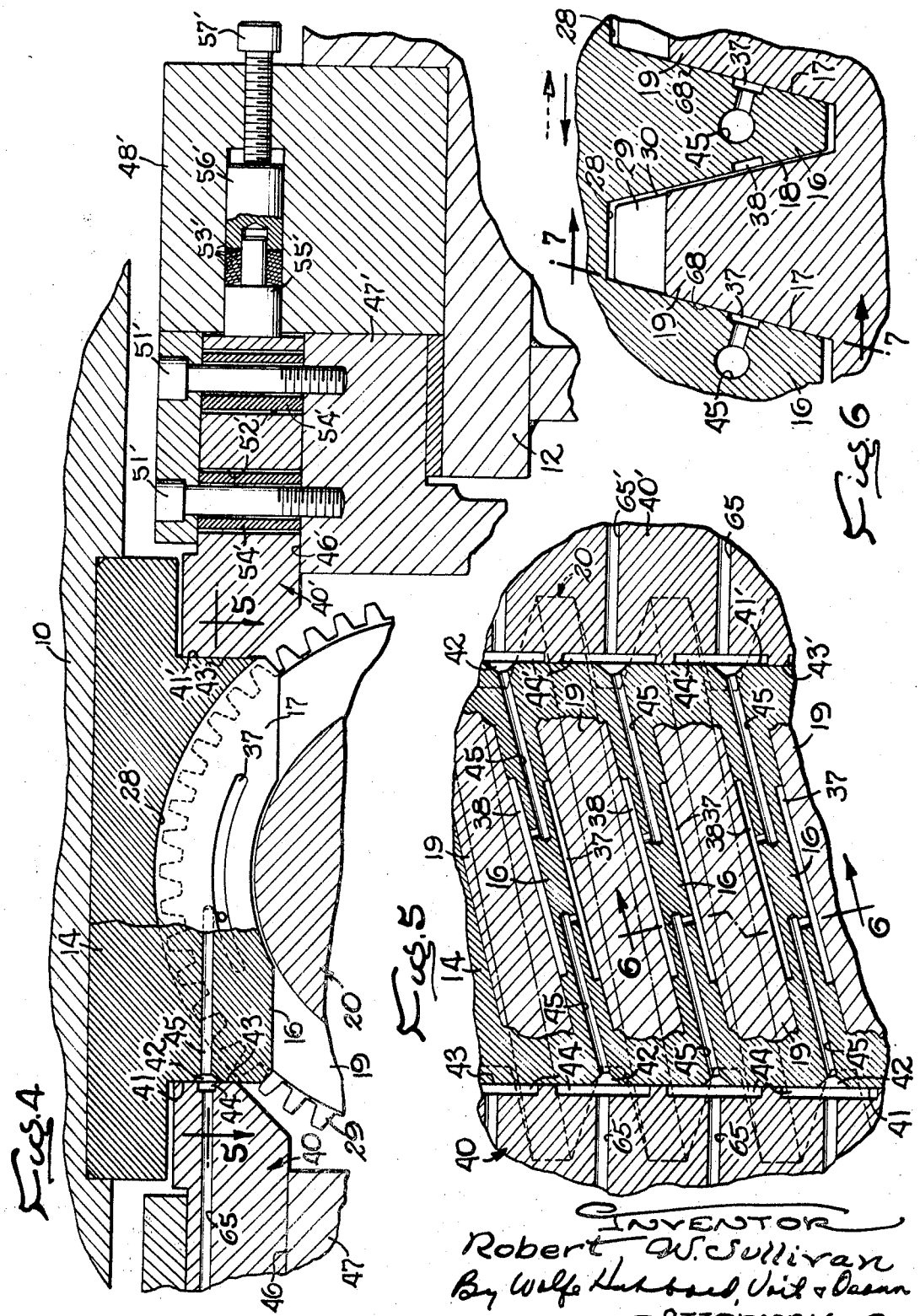

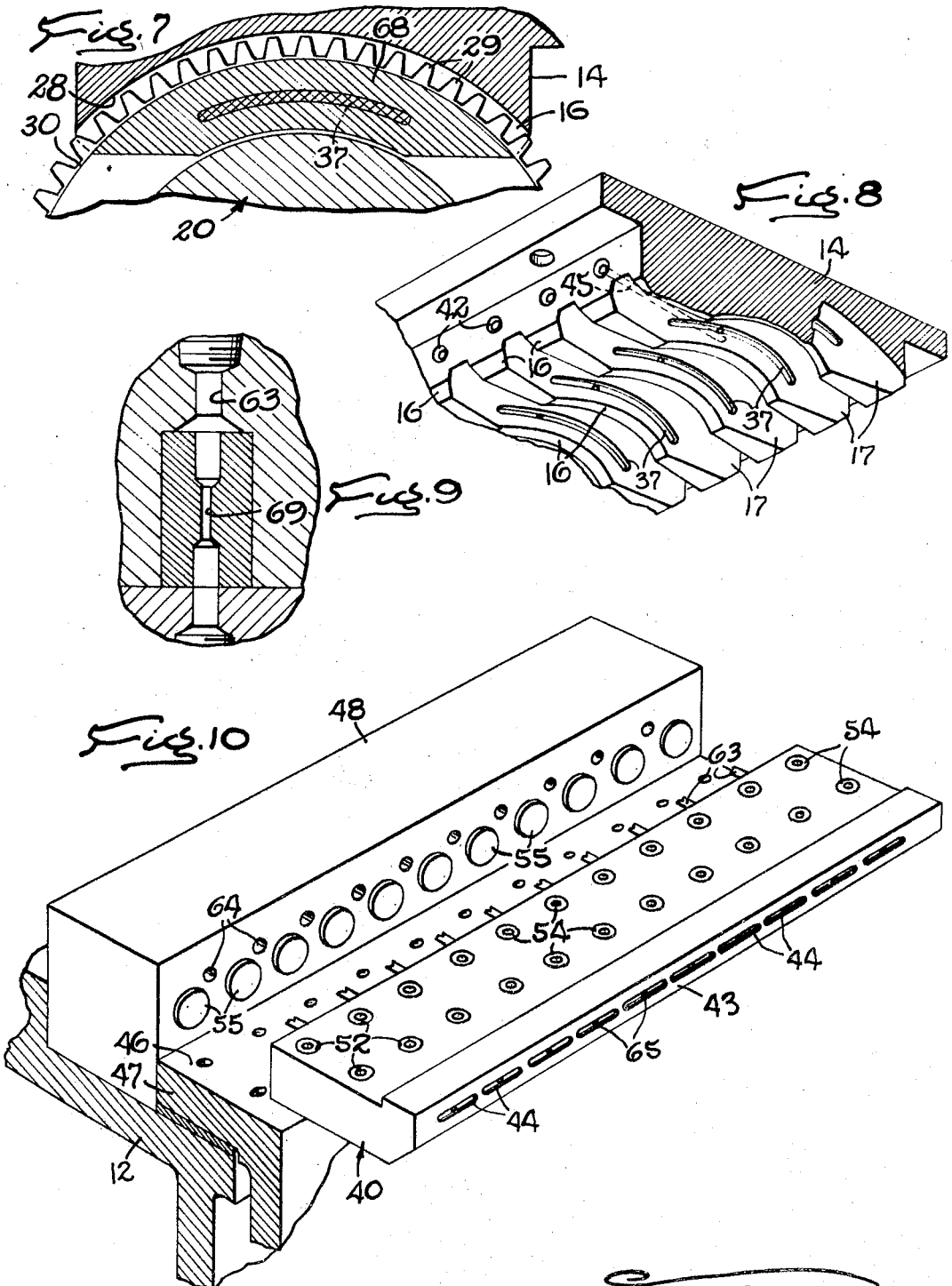

---

3,448,631
WORM-RACK TRANSMISSION WITH HYDROSTATIC TOOTH BEARINGS
Robert W. Sullivan, Rockton, Ill., assignor to The Ingersoll Milling Machine Company, Rockford, Ill., a corporation of Illinois
Continuation of application Ser. No. 618,721, Feb. 27, 1967. This application July 23, 1968, Ser. No. 752,122
Int. Cl. F16h *1/18, 1/20, 57/04*
U.S. Cl. 74—409         12 Claims

ABSTRACT OF THE DISCLOSURE

A sliding machine tool table is driven back and forth through a toothed rack on the table meshing with a power rotated worm whose thread is separated hydrostatically from the opposed areas of the meshing rack teeth by delivering high pressure fluid to so-called pads in the flanks of those rack teeth which are in mesh with the thread in the different positions of the table. Fluid from a high pressure source is delivered through individual passages in a manifold mounted on the machine bed for lateral floating and yieldably urged against the rack. As the table moves back and forth, ports at the face of the manifold and the ends of the passages come into register with ports on the abutting rack wall which lead to only those pads whose teeth are then in mesh with the worm. Accurate distribution of the fluid to the pads of the meshing teeth is achieved by providing flow restrictors in respective passages through the manifold.

Cross-reference to related application

This application is a continuation of my application Ser. No. 618,721, filed Feb. 27, 1967, and now abandoned.

Background of the invention

The invention relates to a power driven transmission for reciprocating a machine element along a rectilinear path by a worm rotating about an axis paralleling such path and having a thread meshing on opposite sides with a plurality of teeth of a rack extending along the path. A transmission of this general type is disclosed in Patent No. 3,323,385 in which hydrostatic pads on the teeth of a rack are supplied with high pressure fluid through a distributor movable with the worm along the rack and having ports which register selectively with ports on the rack leading only to those pads whose teeth are in mesh with the worm in the different positions of the latter along the rack.

Summary of the invention

The object of the present invention is to improve on the patented construction by providing a more effective and durable seal between the opposed and ported surfaces of the rack and distributor and for accurately equalized pressure in the pads of those teeth which at any time are in mesh with the worm thread. This objective is achieved in part by making the opposed faces of the rack wall and the manifold rigid and mounting the latter for limited lateral floating but constantly urging the same toward the rack wall so as to provide an effective hydrostatic bearing at all times between the manifold and the rack. In addition, a flow restrict is interposed in each of the passages leading from the pressure source to the active rack pads thus equalizing the pressures therein.

To separate opposed load transmitting areas of the worm and rack teeth while the driven element is traveling in the opposite direction, similar recesses or pads are formed in the opposite sides of the rack teeth and are supplied with high pressure fluid through a similar second manifold coacting with similar ports spaced along a wall on the opposite side of the rack. The laterally directed pressures exerted on the rack from the two manifolds are thus equalized effectually.

Brief description of the drawings

FIGURE 1 is a fragmentary transverse sectional view of the improved worm-rack drive as applied to the table of a machine tool.

FIGS. 2 and 3 are fragmentary sections taken respectively along the lines 2—2 and 3—3 of FIG. 1.

FIG. 4 is a fragmentary section taken along the line 4—4 of FIG. 2.

FIG. 5 is a fragmentary section taken along the line 5—5 of FIG. 4.

FIG. 6 is a fragmentary section taken along the line 6—6 of FIG. 5.

FIG. 7 is a fragmentary section taken along the line 7—7 of FIG. 6.

FIG. 8 is a fragmentary bottom view of part of the rack.

FIG. 9 is a fragmentary section taken along the line 9—9 of FIG. 1.

FIG. 10 is a fragmentary perspective view of the fluid distributing manifold.

Description of the preferred embodiment

The invention is shown in the drawings incorporated in a drive for a machine tool table 10 supported on horizontal ways 11 along an elongated base 12 and having depending flanges engaging and guided by parallel upright walls 13 along the base. The rack 14 of the present transmission is an elongated bar extending along the center line of the table substantially the full length thereof and secured as by screws 15 to the under side of the table. It is curved in cross-section and the teeth 16, which constitute segments of a nut, are inclined transversely of the rack as shown in FIG. 5 and have opposite flanks 17 and 18 which converge downwardly at a suitable included angle as shown in FIG. 1.

Mating properly with the rack teeth is the thread 19 of a hollow worm 20 which is substantially shorter than the rack and is journaled on the bed 12 at about center of the range of movement of the table. The worm extends along the center of the rack and its axis parallels the table guideways. Its cross-section complements the cross-section of the interdental spaces between the rack teeth as shown in FIG. 6. For a purpose to appear later, the total clearance between the flanks of the thread and the meshing areas of the rack teeth is about .004 of an inch.

A shaft 21 (see FIG. 3) extends through and is keyed at 22 to the worm and opposite ends thereof are telescoped in and keyed to sleeves 23 abutting the ends of the worm and journaled in bearings 24 mounted on the bed. The axial position of the worm is fixed by thrust bearings herein comprising pistons 25 slidable in cylinders 26 and held in abutment with the sleeves by pressure fluid supplied through pipes 27.

In the present instance, power for driving the worm is applied outwardly beyond the opposed flanks or areas, hatched in FIGS. 4 and 7, of effective normal contact between the worm thread and the rack teeth. For this purpose, the interdental spaces of the rack are undercut as indicated at 28 (FIG. 6) to receive gear teeth 29 cut in the worm thread around the periphery thereof beyond the contact areas. The flanks of the gear teeth are cut back at 30 to clear at all times. These mesh with the teeth of a relatively long spiral gear 31 fast on a shaft 32 which is journaled in bearings 33 on the bed and disposed beneath the worm. Rotary power from a suitable and reversible source (not shown) may be transmitted to the gear shaft through gearing 34 (FIG. 3) mounted on the bed. Preferably, the lower part of the gear dips in oil contained within a reservoir 35 enclosing the sides and ends of the gear and the worm.

To maintain the opposed surfaces of the meshing rack teeth and worm thread on the load side thereof separated hydrostatically in all longitudinal positions of the table, hydraulic fluid is delivered to recesses or pads 37 and 38 within the contact areas of the flanks 17 and 18 of the rack teeth and under pressure sufficiently high, for example 3200 p.s.i., to cause an outward flow of the fluid in all directions from each pad and the formation of a rigid film capable of transmitting the actuating force from the worm thread to the rack.

For this purpose, each pad is an elongated and relatively narrow arcuate groove (FIGS. 4 and 7) extending around the rack tooth approximately at the pitch line thereof. The opposed areas of effective contact between the flanks of the rack teeth and the worm thread and surrounding the pads are known as sill surfaces and these, in all directions outwardly from each pad, are approximately equal in width thus providing, in accordance with conventional design techniques, correspondingly equalized outward flows of fluid in forming the desired film maintaining the opposed tooth and thread surfaces separated properly.

The movement of the table 10 and rack bar thereon is utilized to confine the flow of such high pressure fluid to only those pads whose teeth are at any time in mesh with and covered by the worm thread. Escape of the fluid through the uncovered pads beyond the ends of the worm thread is prevented thus avoiding foaming or air contamination of the fluid. Such control of the fluid flow, in the case of the pads 37 on the flanks 17 of the rack teeth, is accomplished through a manifold 40 of a length corresponding to the worm 20 and mounted on the bed 12 in this instance for effective sliding engagement with an outwardly facing wall 41 on the rack paralleling the guides 13 and the table while being held against movement along the rack. An area of the face 43 of the manifold is recessed to provide one or more ports 44 adapted to register in any given position of the table with ports 42 opening outwardly in the wall 41 and communicating through separate passages 45 with those pads 37 then in mesh with and covered by the worm thread. Preferably, the wall 41 is one flat side edge of the rack, the full lengths of the passages 45 being within the rack.

In accordance with one aspect of the present invention, the manifold 40 is constructed and mounted in relation to the rack wall 41 so as to provide an effective hydrostatic bearing at all times between the opposed faces 41 and 43 while accommodating manufacturing irregularities in these surfaces or position variations under variable side loads. For this purpose, the fluid distributing manifold is supported on the machine bed alongside the rack and held against endwise movement but adapted for limited bodily lateral floating toward and away from the rack wall 41, a clearance of a few thousandths of an inch ordinarily allowing for the necessary floating. Herein, the manifold is a bar resting on the flat upper surface 46 of a flange 47 of the bed 12 and held loosely between the rack and a bar 48 clamped by screws 49 to the bed. The manifold is held down by screws 51 extending through spacer sleeves 54 disposed in holes 52 which are sized to provide desired clearances. The manifold is urged toward the rack under heavy spring pressure distributed along the manifold over substantially the full length thereof. Such pressure is derived from stacks 53 of Belleville type washers each compressed between one plunger 55 slidable in the bar 48 and bearing against the outer face of the manifold and a plunger 56 advanced by a screw 57 threading into the bar. In the present instance, the spacing of the sets of plungers and springs along the length of the manifold corresponds to the spacing of the teeth 16 of the rack.

Provision is made for delivering hydraulic fluid to and maintaining in each of the pads 37 of the rack teeth meshing with the worm thread the high pressure required for maintaining the opposed flanks thereof separated effectually by an oil film of sufficient rigidity to transmit the loads encountered in service use. Such fluid is supplied by a high pressure pump 58 driven by a motor 59 and drawing fluid from a sump 60 from which fluid escaping across the sills surrounding the pads is collected in the reservoir 35 and overflows through a pipe 61 to the sump. From the pump outlet pipe 62, the high pressure fluid is forced through separate pipes 63 which are telescoped loosely in parallel holes 64 extending transversely through the bar 48 and disposed between adjacent ones of the spring units as shown in FIG. 2. The pipes thread into holes 65 in the outer face 66 of the manifold extending to the ports 44 above described which are spaced along the manifold for registry with successive ones of the rack ports 42 in the movement of the table along the bed. Herein, each manifold port 44 is elongated (see FIG. 10) in the direction of the table movement and is sized to pass out of registry with one rack port 42 as it comes into registry with the next rack port. Thus, the port of each rack tooth covered by and meshing with the worm is connected continuously to and supplied with high pressure fluid from the pump outlet. The flow of high pressure fluid to all of the parallel connected pads 37 is maintained substantially uniform by interposing an automatic flow control valve, a capillary passage or, as in this instance, a restricting or so-called jet orifice 69 (FIGS. 1 and 9) in each passage leading from the supply line 62 to each of the pads 37. Herein, these restrictions are located upstream from the manifold 40 and in the pipes 63 leading from the supply line.

With the manifold constructed, mounted and supplied with high pressure fluid as above described, the recesses 44 along the manifold 40 are utilized to provide hydrostatic bearing pads for separating the opposed surfaces 43 and 41 of the manifold and the rack and maintaining a thin oil film between these surfaces. For this purpose, the forces of the spring 53 are adjusted by the screws 57 so as to allow for some leakage of the high pressure fluid in all directions across the sills formed by the surfaces 41 and 43 around the recesses 44, the same as around the pads 37. This leakage also falls into the reservoir 35 and overflows back to the sump 60.

With the ports 42 communicating with the pads 37 on the flanks 17 of the rack teeth as shown in FIGS. 5 and 6, the rigid oil films formed around these pads will sustain the load incident to advancing the table in the direction of the arrows by turning of the worm in the direction to force its flank 68 (FIG. 6) against the flanks 17 of the meshing rack teeth. To provide similar hydrostatic films for sustaining and transmitting the load when the worm is turned reversely to advance the rack and table in the direction of the dotted arrows, the pads 38 above described are of the same size, shape and location as the pads 37 are located on the opposite flanks 18 of the rack teeth and supplied with pressure fluid through a second manifold 40′ extending along the opposite side wall 41' of the rack. Each of the duplicated parts involved is indicated by the same but primed reference numerals.

As in the case of the manifold 40, the face 43' of the manifold 40' is urged by the spring 53' toward the wall 41' on the edge of the rack 14 opposite the wall 41 and high pressure fluid from the pump is delivered through the restrictions 69', pipes 63', and passages 65' to the ports 44' in the manifold face. In the movement of the table along the bed, these ports register only with those ports 42' connected through the passages 45' to the pads 38 in the flanks 18 of the rack teeth which are in effective mesh with the worm. The hydrostatic fluid films thus formed between the worm thread and the meshing rack teeth sustain the load incident to the table advance and provides between the rack and worm the desired rigid bearing free of rubbing friction. As before and as each rack tooth 16 passes out of effective mesh with the worm thread during the advance of the table, the port 42 or 42' of the pad 37 or 38 of such tooth will have moved beyond the last of the manifold ports 44 or 44' thus disconnecting such pad from the pump. As a result, the manifolds 40 and 40' act in response to the movement of the table to confine the flow of high pressure fluid to the pads 37 and 38 whose rack teeth are in effective meshing which worm. The escape of the pressure fluid through the other or uncovered pads 37, 38 is thus prevented and the foaming or air contamination of the fluid in the circulating system is avoided. As the port 42 or 42' of each rack tooth passes beyond the end of the manifold surface 43 or 43' and becomes uncovered, the fluid in the connected passages 45 or 45' and pad 37 or 38 is free to drain out into the reservoir 35. Then, when in the reverse movement of the table bringing the pad of the same rack tooth back into mesh with the worm, the emptied passage and recess are refilled immediately thus reforming and maintaining the hydrostatic pad.

I claim as my invention:

1. A rack and worm transmission having, in combination, first and second supports mounted for relative movement along a rectilinear path, a rack secured to and extending along said first support and having teeth spaced along and extending transversely of said path, a power rotated worm shorter than said rack journaled on said second support to turn about an axis paralleling said path and having a multiple turn thread meshing with a plurality of said teeth along said rack, a wall on said first support extending along said rack parallel to said path, and means acting during relative movement of said supports along said path to provide hydrostatic bearings between opposed areas of said thread and the rack teeth meshing therewith comprising pads on one side of each of said rack teeth within said areas, passages leading from the respective pads to ports terminating in said wall and spaced along the latter in accordance with the spacing of the rack teeth, a rigid fluid pressure manifold extending along said wall, means on said second support mounting said manifold for limited bodily floating toward and away from said wall, means urging said manifold toward and holding the same in sliding engagement with the wall, a fluid filled recess area within the face of said manifold opposing and enclosing the ports of those rack teeth which at any time are in mesh with said thread while leaving the other ports open, and means for supplying fluid to said manifold and maintaining the fluid in said recess area, the registering ports, and connected pads at a pressure sufficiently high to separate hydrostatically the opposed surfaces of said thread and the teeth meshing therewith in any relative position of said supports.

2. The combination defined in claim 1 in which said wall is a flat and rigid side surface on said rack.

3. The combination defined in claim 1 in which said pressure is sufficiently high to maintain said wall and said manifold face separately hydrostatically.

4. The combination defined in claim 1 including means on said second support mounting said manifold for limited bodily floating toward and away from said wall and a plurality of means spaced along said manifold and acting to exert thereon separate forces urging the manifold toward and holding the same in sliding engagement with said wall.

5. The combination defined in claim 1 in which said manifold recess area includes a plurality of ports spaced along the manifold face for simultaneous registry with the ports of the rack teeth in mesh with said worm.

6. The combination defined in claim 5 in which each of said manifold ports is long enough in the direction of said relative movement to come into registry with one of said rack ports before passing out of registry with the adjacent preceding rack port.

7. The combination as defined in claim 1 in which said high pressure fluid is supplied to the respective manifold ports through separate parallel passages each including a restrictor limiting the fluid flows to the connected port.

8. The combination defined in claim 1 in which said wall and manifold are disposed along one side of said rack and including a second similar wall on said first support on the side thereof opposite said first wall, a second row of oppositely facing ports spaced therealong and respectively communicating with pads in said rack teeth on the flanks thereof opposite said first pads, and means on said second support duplicating said manifold and said pressure supply means and coacting with said second ports to deliver said high pressure fluid only to the second pads of the rack teeth meshing at any time with said worm thread.

9. The combination defined in claim 8 in which said ports leading to the pads on opposite sides of each rack tooth are in flat parallel walls extending along opposite side edges of said rack and similarly sized to substantially equalize the oppositely directed pressures acting on opposite side faces of said first support.

10. The combination defined in claim 1 in which said wall and the opposed side face of said wall are flat and rigid and, under the pressure of the fluid delivered through said passages, are maintained separated by a film of said fluid flowing laterally across said wall and side face from the registering ports thereon thus providing a hydrostatic bearing between the rack and manifold during the back and forth movements of said movable support.

11. A rack and worm transmission having, in combination, first and second supports mounted for relative movement along a rectilinear path, a rack secured to and extending along said first support and having teeth spaced along and extending transversely of said path, a power rotated worm shorter than said rack journaled on said second support to turn about an axis paralleling said path and having a multiple turn thread meshing with a plurality of said teeth along said rack, a rigid wall on said first support extending along said rack parallel to said path, and means acting during relative movement of said supports along said path to provide hydrostatic bearings between opposed areas of said thread and the rack teeth meshing therewith including pads on one side of each of said rack teeth within said areas, passages leading from the respective pads to ports terminating in said wall and spaced along the latter in accordance with the spacing of the rack teeth, a rigid fluid pressure distributor mounted on said second support alongside said wall and having a side face enclosing the ports of those rack teeth which at any time are in mesh with said thread while leaving the other ports open, a source of fluid under high pressure, passages extending through said manifold for admitting fluid from said source to the active ports on said wall covered by the distributor, and means utilizing said fluid flowing through said distributor to hold the opposed rigid surfaces of said wall and said distributor separated hydrostatically during relative back and forth movement between said supports.

12. A rack and worm transmission as defined in claim 11 in which said last mentioned means includes a narrow clearance between said opposed surfaces and means mounting said distributor for limited lateral floating toward and away from said wall and means for urging the distributor toward said wall under sufficient pressure to maintain said clearance and permit a continuous flow of said pressure fluid outwardly and laterally from each of said active ports and in all directions across said wall whereby to provide a hydrostatic bearing between such surfaces.

References Cited

UNITED STATES PATENTS

| | | | |
|---|---|---|---|
| 2,320,353 | 6/1943 | Ernst et al. | 74—467 X |
| 2,924,125 | 2/1960 | Brandon | 74—409 X |
| 3,323,385 | 6/1967 | Revitt | 74—424.6 X |
| 3,361,003 | 1/1968 | Hodgson | 74—424.6 |

DONLEY J. STOCKING, *Primary Examiner.*

L. H. GERIN, *Assistant Examiner.*

U.S. Cl. X.R.

74—424.6, 468